(No Model.)

S. R. LOWCOCK.
FILTRATION.

No. 530,784. Patented Dec. 11, 1894.

Witnesses:—
George Shaw
Richard Skerrett

Inventor:—
Sidney Richard Lowcock

UNITED STATES PATENT OFFICE.

SIDNEY RICHARD LOWCOCK, OF BIRMINGHAM, ENGLAND.

FILTRATION.

SPECIFICATION forming part of Letters Patent No. 530,784, dated December 11, 1894.

Application filed May 21, 1894. Serial No. 511,999. (No model.) Patented in England March 24, 1892, No. 5,787.

*To all whom it may concern:*

Be it known that I, SIDNEY RICHARD LOWCOCK, a subject of the Queen of Great Britain, residing at Birmingham, England, have invented certain new and useful Improvements in Filtration, (for which I have obtained Letters Patent in Great Britain, No. 5,787, dated March 24, 1892;) and I do hereby declare that the following is a full, clear, and exact description of the invention, which will enable others skilled in the art to which it appertains to make and use the same.

My invention has for its object the rapid and effectual removal of organic matter both animal and vegetable from liquids containing it, such for example as sewage and sewage polluted water and consists in conducting the filtration of such liquids by means of the apparatus hereinafter described.

The essence of my invention consists in subjecting the liquid to be purified to a filtering process in which the filtering material is kept charged with atmospheric air or oxygen introduced into and forced through the said material under pressure, the liquid slowly descending through the filtering material and meeting in its descent the atmospheric air. The liquid in a state of minute division is thus rapidly and effectually aerated and the organic matter rapidly revolved into innocuous inorganic compounds whether by direct oxidation or by the action of bacteria or micro-organisms.

Figure 1:
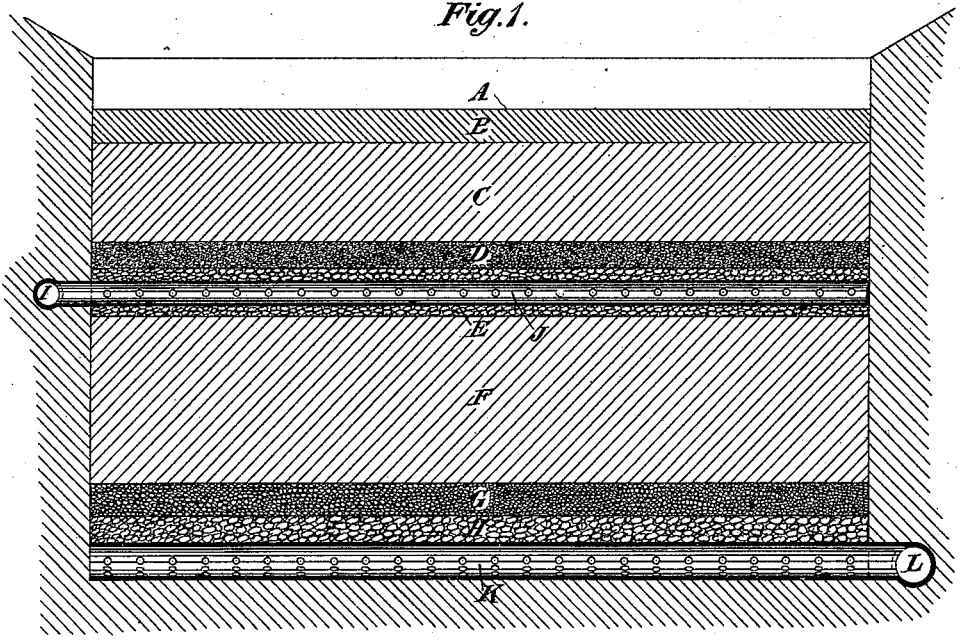
Figure 2:
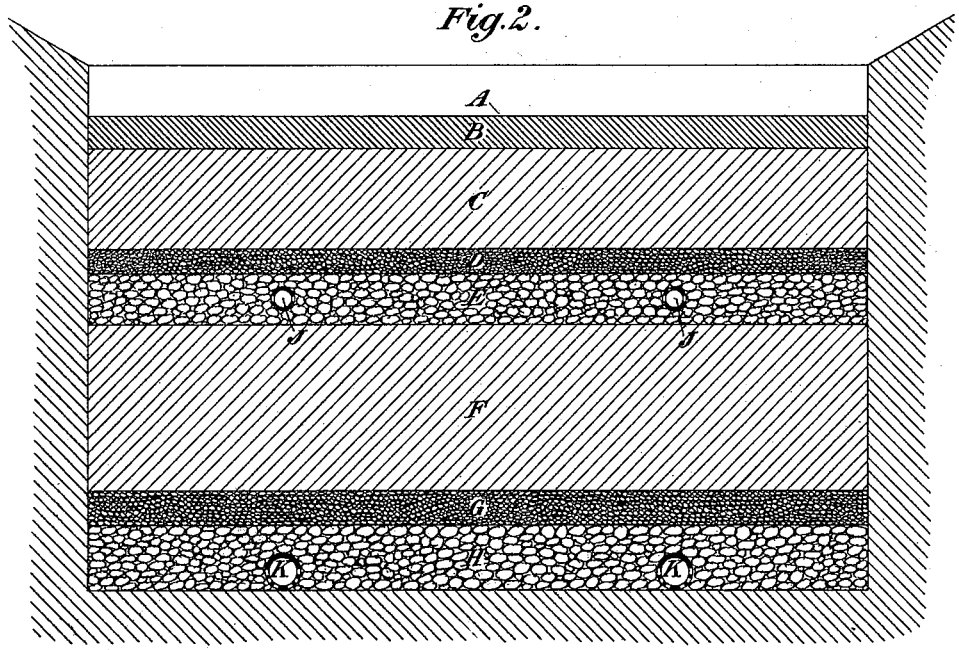

In the accompanying drawings, Figure 1 represents in longitudinal section and Fig. 2 in cross section a filter constructed according to my invention.

A is the top surface of the filter to which the liquid to be purified is evenly supplied.

B is a layer of more or less finely porous material by which the rate of flow of the liquid through the coarser material below may be regulated.

C and F are layers of filtering material, for example sand or sandy soil.

D and G are layers of fine gravel or stones supporting the finer filtering material.

E is a layer of coarse gravel or stones in which the perforated air pipes J, J are laid. These pipes and the layers E and D distribute the air with approximate uniformity through the whole material of the filter.

H is a similar layer of coarse gravel or stones in which the drain pipes K, K are laid.

I is the main air pipe through which the air or oxygen under pressure is forced by a rotary fan or other blower or compressor and conveyed to the branch air pipes J, J.

L is the main drain having a free outlet below the level of the bottom of the filter. This pipe conveys from the filter the purified effluent collected by the pipes K K.

The action of the filter is as follows:—The liquid to be purified is supplied to the surface of the filter at A. Air or oxygen is forced into the body of the filter through the perforations in the pipes J, J embedded in the layer of gravel or stones E and the said air or oxygen is distributed through the whole material of the filter. The downward flow of the liquid is retarded in the upper portion of the filter by the fine material of which the said upper portion is made and by the pressure of the injected air and the flow of the liquid is accelerated in the lower portion of the filter by gravity and by the pressure of the injected air. The uppermost layer or layers of the filtering material are charged with the liquid which passes slowly downward from them in thin films over and between the coarser grains of the material forming the lower and principal part of the filter. The interstices in the lower part of the filter being larger than those in the upper part the said interstices are not filled with the liquid which runs over the grains or particles of the filtering material leaving the said interstices so far unoccupied by liquid as to permit of the free circulation in the filtering material of the introduced air or oxygen. By this fine division of the liquid its absorbing surface is enormously increased and the liquid becomes rapidly charged with the air or oxygen to which it is exposed.

The pressure at which the air or oxygen is introduced into the filter must be below that at which the filtering material would be disturbed and blow holes formed. I have found that a pressure equal to a head of three inches of water in a filter having a total depth of three feet and in which the air or oxygen is supplied at a depth of eighteen inches from the surface of the filter answers well in practice. I do not however limit myself to these proportions as they must be varied according to the nature of the filtering material available at the locality where the filtering is conducted.

Although my invention is specially adapted for the purification of liquids from organic matters by aeration, yet I wish it to be understood that liquids treated according to my invention are also mechanically filtered that is are cleared of suspended solid particles contained in them. The solid suspended particles are collected on the top of the layer of filtering material and the said top layer must be reviewed from time to time according to the rate at which the solid matter accumulates on it. I prefer however to deprive the liquid to be operated upon to a great extent of suspended matter by previously storing it for a time in a subsiding tank.

Prior to my invention air had been periodically forced into uniformly granulated material after the reverse current has been driven through to cleanse it. I lay no claim to this feature, as my invention consists in so locating the pipes supplying a continuous current of air, or oxygen, to filtering layers of fine and coarse material, that the fluid will be retarded in passing the upper layer, or layers, of fine material by the passage of the air and will be accelerated in passing through the coarse layer below by the pressure of said air, or oxygen.

Having now particularly described and ascertained the nature of my invention, and in what manner the same is to be performed, I declare that I claim as my invention—

The herein described apparatus for the filtration and aeration of liquids, the same consisting of alternate layers of fine and coarse filtering material, perforated air conveying pipes located in a layer of coarse filtering material at the base of an upper layer of finer filtering material and connected with a main air pipe through which a continuous current of air or oxygen may be forced under pressure into said perforated pipes and thence to the interstices of the filtering material, perforated drain pipes located at the bottom of the filter in a layer of coarse material, and a main drain connected with said pipes below the level of the bottom of the filter, substantially as specified.

SIDNEY RICHARD LOWCOCK. [L. S.]

Witnesses:
GEORGE SHAW,
RICHARD SKERRETT.